Dec. 22, 1964          R. WILKERSON          3,162,430
OVEN CONTROL
Filed Dec. 29, 1961          5 Sheets-Sheet 1
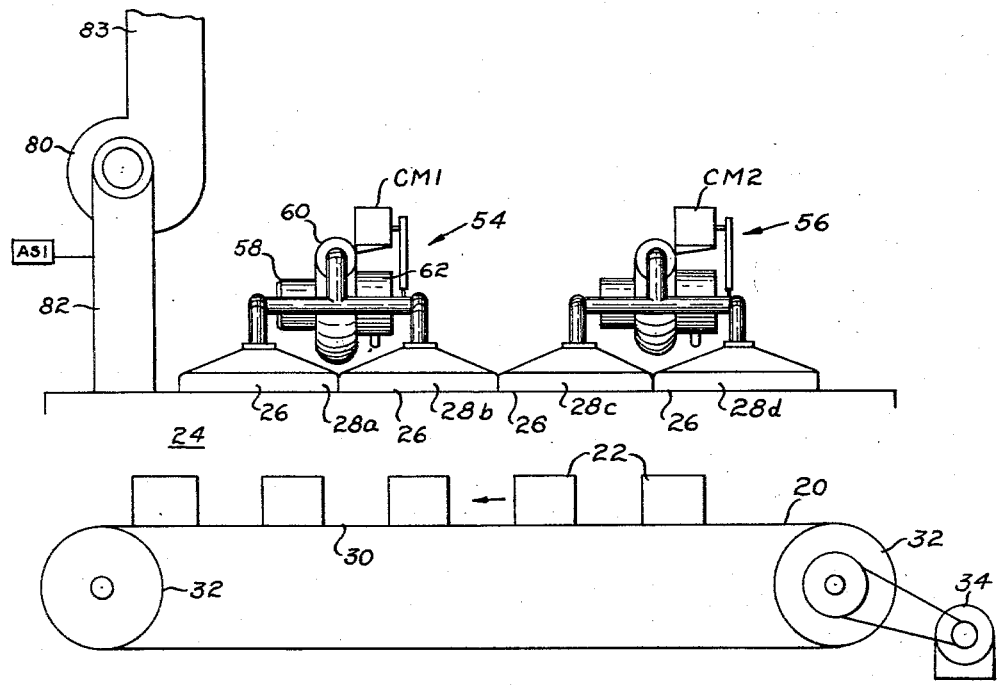
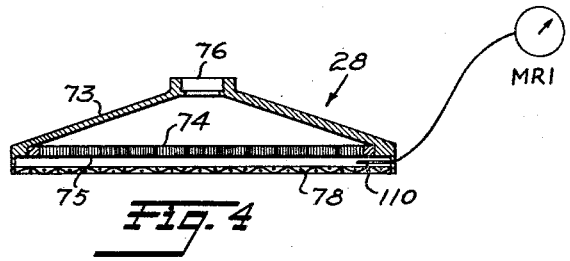
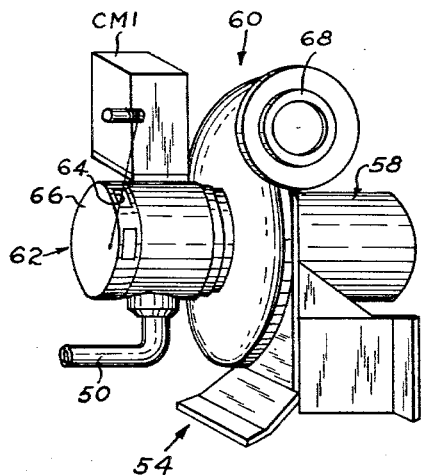
INVENTOR
RUFUS WILKERSON
BY Strauch, Nolan & Neale
ATTORNEYS

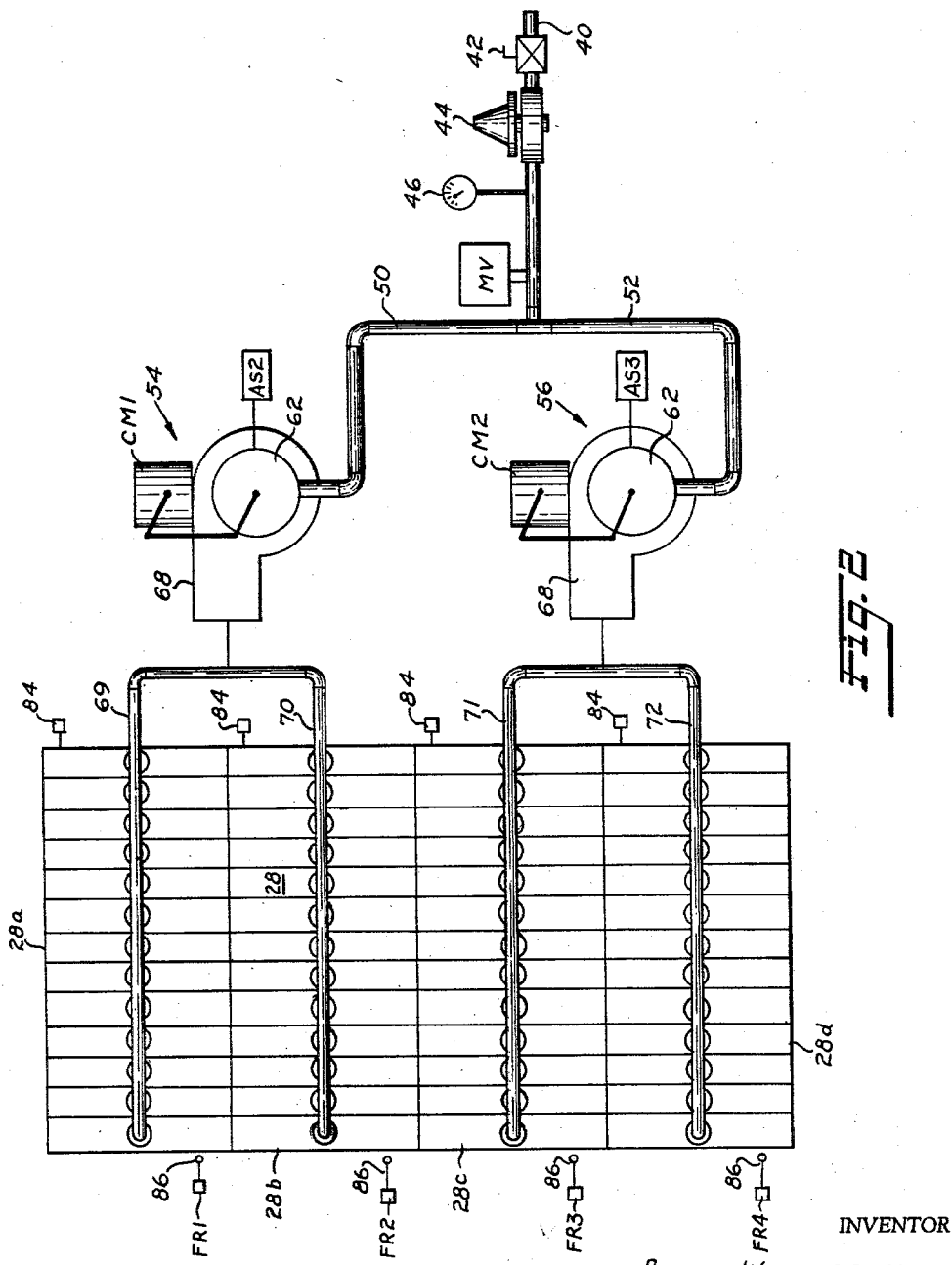

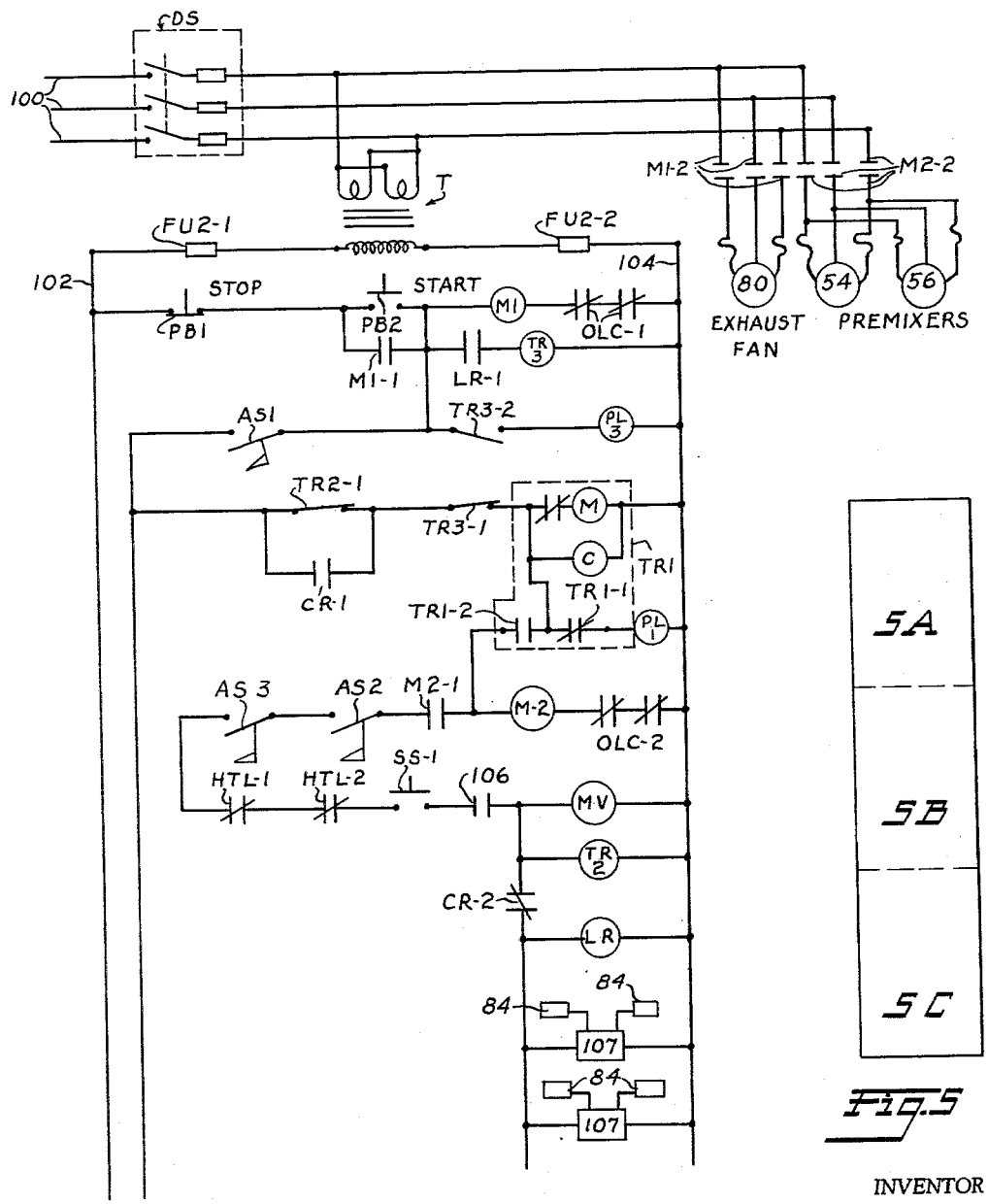

United States Patent Office 3,162,430
Patented Dec. 22, 1964

3,162,430
OVEN CONTROL
Rufus Wilkerson, Mount Clemens, Mich., assignor to Hupp Corporation, Cleveland, Ohio, a corporation of Virginia
Filed Dec. 29, 1961, Ser. No. 163,112
15 Claims. (Cl. 263—6)

This invention relates to a control system for industrial ovens and, more particularly, to a system for controlling banks of gas-fired infrared generators arranged to supply heat to articles traveling past the radiant surfaces of the generators on a conveyor. Industrial ovens of the type with which such systems are most useful are described in detail in copending application No. 50,421 filed August 18, 1960, by John J. Fannon, Jr., having a common assignee with the instant application.

It is necessary, in industrial ovens of the type disclosed in the copending application, to provide safeguards: (1) for preventing combustion products and vapors given up by the heated articles from accumulating in the oven and creating an explosion and fire hazard; (2) for protecting the oven components and auxiliary equipment from heat damage in case the conveyor fails to operate or because of an unduly high combustion rate; and (3) for preventing damage to the infrared generators due to the overheating of their radiant surfaces to excessively high temperatures. Also, in such ovens, ignition means must be provided to facilitate lighting of the infrared generators without danger to the operator and with no possibility of unburned noxious gas escaping. In addition, fire insurance inspection authorities require equipment of this nature installed in buildings insured by them to comply with specific safety and performance regulations.

Accordingly, the primary object of this invention is to provide a system for supplying fuel to a conveyor type industrial heating oven in which heat is supplied by gas-fired, infrared generators and to provide a system for controlling the supply of fuel to the infrared generators which will eliminate the possibility of dangerous conditions arising, which will meet the requirements of fire insurance underwriters, which will protect the auxiliary equipment and articles being processed from overheat damage, which will eliminate the possibility of burning out the radiant surface material of the infrared generator due to an excessive combustion rate, and which will facilitate starting of the infrared generators without hazard to the operator.

The radiant surface of an infrared generator must be maintained at a temperature near 1600° F. for efficient operation. However, temperatures significantly above this optimum will damage the radiant surface material.

It is, therefore, a further object of this invention to provide a control system having means for controlling the temperature of the radiant surface by cutting off or modulating the fuel supply if a desired maximum temperature is exceeded. In conjunction with the foregoing object, it is a further object of the present invention to provide means permitting manual restoration of generator operation as soon as the radiant surface has cooled to a temperature at which such operation may be safely resumed.

These and other objects of the present invention will become more fully apparent by reference to the appended claims as the following detailed description proceeds with reference to the accompanying drawings wherein:

FIGURE 1 is a partially schematic side elevational view of a conveyor type industrial oven equipped with infrared generators and a control system constructed in accordance with the principles of the present invention;

FIGURE 2 is a diagrammatic representation of the infrared generators and a fuel-air supply system for supplying a combustible mixture to them;

FIGURE 3 is a perspective view of one form of suitable fuel-air premixer;

FIGURE 4 is a sectional view of one of the infrared generators; and

Figure 5B:
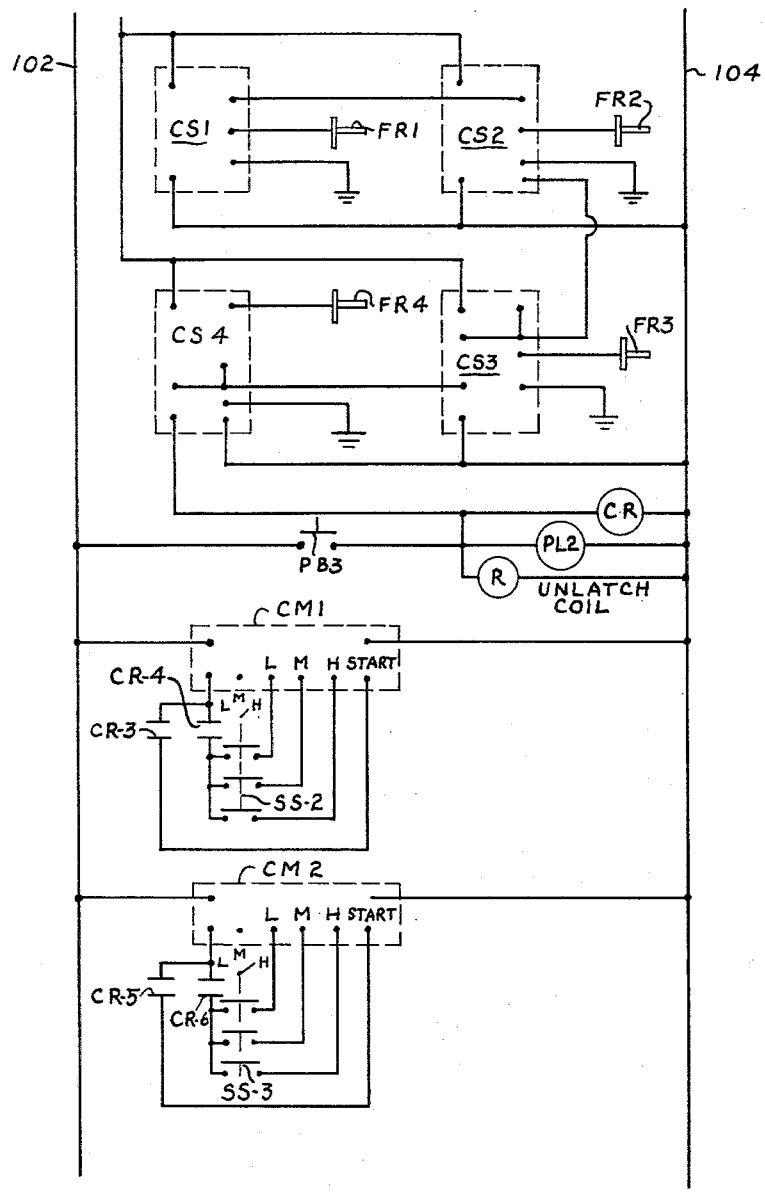
FIGURE 5 is a block diagram illustrating the relationship of FIGURES 5A, 5B, and 5C which, taken together, constitute the circuit diagram of a control system constructed in accordance with the principles of the present invention.

Referring now to FIGURE 1, a conveyor 20 carries the articles 22 to be heated through an oven 24 (the parts traveling in the direction of the arrow) beneath the radiant surfaces 26 of four banks 28a, 28b, 28c, and 28d of gas-fired infrared generators 28 disposed in the oven interior. Conveyor 20 may be of any suitable type; for example, a continuous belt or chain 30 of heat resistant material driven over sprockets 32 by a motor 34. In operation, the articles to be heated are loaded, at one end of oven 24, onto conveyor 20 which carries them through the oven adjacent the radiant surfaces of the infrared generators, where they are heated to the desired temperature, and then to the opposite end of the oven where they may be unloaded from the conveyor.

Referring next to FIGURE 2, a combustible fuel-air mixture is supplied to the banks 28a, 28b, 28c, and 28d of infrared generators 28 from any suitable source through a supply line 40. The gas passes through a manual shut-off valve 42 and a pressure regulator 44, then past a pressure gauge 46 and through a motorized valve MV into two branch lines 50 and 52. These branch lines are connected to the inlets of motor-driven premixers 54 and 56 which mix the gas with air in a predetermined gas-air ratio. An many premixers may be used as is necessary to provide the total heat input required in a particular application. Suitable premixers are marketed commercially by Maxon Premix Burner Company, Muncie, Indiana, and others, and the premixers by themselves form no part of the present invention.

Referring next to FIGURE 3, each of the premixers 54 and 56 is powered by an electric motor 58 which drives the fan rotor (not shown) of an induction blower 60, which draws gas and air into a mixing chamber (not shown) through a proportioning valve 62. Gas branch line 50 (or 52 as the case may be) is connected to the lower end of valve 62, while air enters the valve through rectangular openings 64 which can be varied in size by rotating shutter cover 66. Rotation of this cover also changes the size of the gas inlet opening in line 50 by moving a valve member (not shown) located in line 50 at the point where it enters valve 62. The size of the gas inlet opening for each position of cover 66 is regulated by an adjustable cam, (not shown) in such a manner that rotation of cover 66 changes the flow rate of the gas-air mixture to the infrared generators and either maintains or varies the gas-air ratio as desired. The gas and air are mixed by rotation of the blower fan and the mixture leaves the blower under pressure through outlet opening 68, from which point it is piped to the infrared generator banks 28a, 28b, 28c, and 28d through lines 69, 70, 71, and 72, respectively (see FIGURE 2).

Covers 66 are rotated by control motors CM1 (premixer 54) and CM2 (premixer 56). Each of these control motors is automatically adjusted by the novel control system of the present invention from a lighting position providing a rich starting mixture to a running position providing a somewhat leaner operating mixture for maximum combustion efficiency. Manual controls, which will be described in detail later, are provided for adjusting the running position to obtain the desired heat output.

In the illustrated embodiment, two of the four banks 28a, 28b, 28c, and 28d of infrared generators are connected to each of the premixers 54 and 56. The number and arrangement of the burners as well as the order in which they are connected to the premixers and the number of premixers can, of course, be varied as desired to meet the needs of a particular situation.

Referring next to FIG. 4, each of the infrared generators 28 in the banks 28a, 28b, 28c, and 28d may take one of a number of forms and typically consists generally of a metal housing 73, one side of which (in this case the bottom) is open. The open side is closed by a number of ceramic blocks 74 which are cemented in place and which constitute the radiant surface. A large number of small perforations or apertures 75 extend through each of the blocks and open onto both faces thereof. The combustible gas-air mixture piped to the generator from the premixers passes through an inlet opening 76 to the interior chamber or plenum of the generator housing 73. Being under pressure, the mixture then passes through the apertures 75 to the lower faces of blocks 74 where it is ignited. The mixture burns adjacent the lower faces, heating them to incandescence and thereby causing an emission of infrared radiation which strikes and heats the articles traveling through oven 24 on conveyor 20. A metal screen 78 supported on the order of one-fourth inch from the radiant surface of the generator increases its efficiency and assists in providing a uniform distribution of radiant energy. Infrared generators of the type illustrated in FIGURE 4 are described in detail in United States Patent No. 2,775,294 issued December 25, 1956 to Gunther Schwank, to which reference may be had if deemed necessary.

The control system provided by the present invention is not, nor is it intended to be, limited to use with infrared generators of the type illustrated in FIGURE 4. On the contrary, the instant system may be employed in conjunction with any of the infrared generators disclosed in said copending application No. 50,421 or, indeed, with any generator of this general type.

Oven 24 is purged of combustion products, volatile substances emitted from the articles heated, and other undesired gaseous substances by a motor-driven exhaust blower 80. The blower intake (see FIGURE 1) is connected by a duct 82 to the interior of the oven. The blower outlet may be connected by a duct 83 to any suitable discharge point.

At one end of each of the banks 28a–d of infrared generators is a sparkplug-type igniter 84 (see FIGURE 2). Arranged at the opposite ends of the banks are safety burners 86.

Arranged immediately adjacent the safety burners 86 so that the burner flames will impinge on them are flame rods FR1, FR2, FR3, and FR4 which establish continuity in the control system circuit when all four of the flames are burning but which interrupt the continuity of this circuit to close down the system and disconnect the infrared generators from their source of fuel and air if one or more of the burner flames should go out. This is an important safety feature of the present invention and prevents the oven 24 from filling with explosive, combustible gas should the infrared generators (which have the same gas-air supply source as the safety burners), for any reason, go out.

To further insure the safe operation of oven 24, an airflow switch AS1 is located in the duct 82 connecting the interior of oven 24 to the inlet of exhaust blower 80. Similar airflow switches AS2 and AS3 are located at the air inlet of each of the fuel-air premixers 54 and 56. The closing of airflow switch AS1 is indicative of the fact that exhaust blower 80 is operating to purge the interior of oven 24. If blower 80 fails to operate, switch AS1 will never close and the control system will never become operative to supply the fuel-air mixture to the infrared generators 28. Similarly, airflow switches AS2 and AS3 close only if the blowers of premixers 54 and 56 are causing a normal flow of air into the mixing chamber. In this manner, it is insured that the premixers are operating properly before fuel and air are supplied to the infrared generators 28.

Referring next to the circuit diagram of FIGURE 5, electrical power is supplied from suitable supply mains 100 (which in the illustrated embodiment provide 440 volt, three-phase 60-cycle current) through the disconnect switch DS (which may be any suitable three-phase single throw switch of adequate capacity): (1) to the motors of premixers 54 and 56 through the contacts M2—2 of relay M2 (when these normally open contacts are closed); (2) to the motor of exhaust blower 80 through the contacts M1–2 of relay M1 (when these normally open contacts are closed); and (3) to the primary winding of control circuit transformer T. The opposite sides of the secondary winding of transformer T are connected through fuses FU2–1 and FU2–2 to the main leads 102 and 104 of the control circuit.

In order to condition the oven for operation, biased open start switch PB2 is manually closed, establishing a circuit from lead 102 through normally closed stop switch PB1, the now closed start switch PB2, the coil of the motor starter or relay M1, and the closed overload cutouts OLC–1 in the exhaust fan circuit to lead 104, energizing relay M1. Energization of relay M1 closes holding contacts M1–1 which shunt the start switch PB2 so that the circuit will remain energized when the start switch is released.

Energization of relay M1 also closes contacts M1–2, activating the motor of exhaust fan 80 to purge oven 24. When fan 80 reaches normal operating speed, airflow switch AS1 in duct 82 closes, indicating a normal flow of the exhaust stream in that duct. Closing of airflow switch AS1 (following closing of contacts M1–1 by energization of relay M1) energizes the purge timer TR1 (normally closed contacts TR2–1 and TR3–1 are closed at purge timer energization). Since purge timer contact TR1–1 is also closed at this time, signal light PL1 lights, indicating that the purge cycle has been initiated. The time required for purging oven 24 will be determined by the volume of the oven and the capacity of the exhaust fan 80. In any event, the purging cycle should be of sufficient duration to remove all gases that might form an explosive or combustible mixture from the oven interior.

Upon completion of the purge cycle, the contacts TR1–1 of the purge timer TR1 open and signal light PL1 goes out, indicating that the cycle has been completed. Simultaneously, purge timer contacts TR1–2 close, completing the circuit from timer TR1 through premixer starter coil or relay M2 and overload contacts OLC–2 in the premixer motor circuit to main lead 104. Energization of relay M2 closes relay contacts M2–1 and M2–2 (closing of the latter switch starts the premixer blowers 54 and 56). When blowers 54 and 56 reach normal operating speed, premixer airflow switches AS2 and AS3 (which are connected in series with relay contacts M2–1) close, further conditioning the control circuit.

Figure 5C:
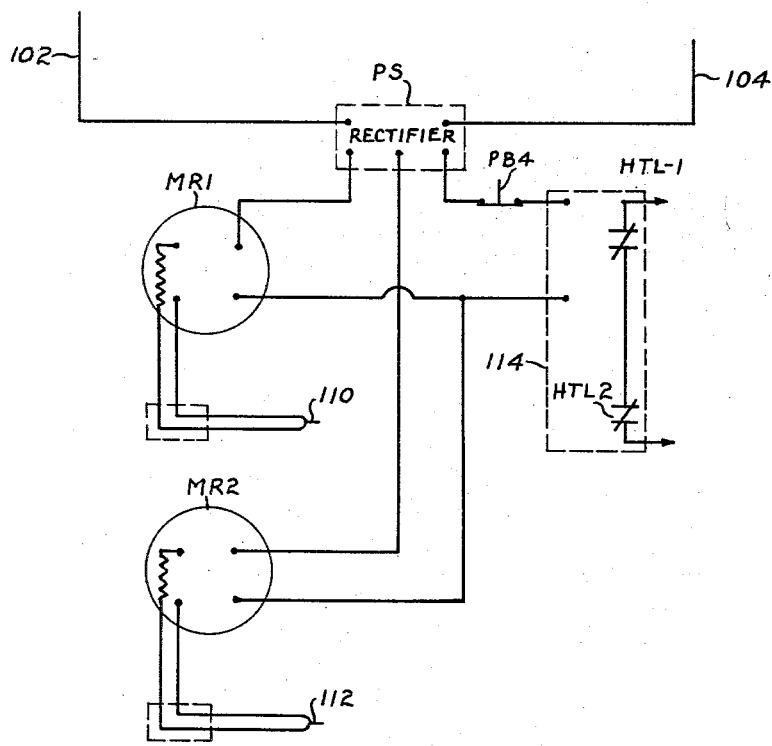

In series with relay contacts M2–1 of relay M2 and airflow switches AS2 and AS3 are a pair of high temperature limit contacts HTL–1 and HTL–2 of temperature limit control 114 and a conveyor interlock switch 106. It should be noted that the switches HTL–1 and HTL–2 shown in FIGURE 5C are the same switches as those identified by the same reference characters in FIGURE 5A. These switches have been shown in this manner to facilitate understanding of the control circuit operation. The high temperature limit contacts HTL–1 and HTL–2 are designed to open if the radiant surfaces of the infrared generators adjacent which they are disposed should exceed a predetermined maximum temperature. Conveyor interlock switch 106 is arranged to open when the conveyor 20 stops. Also connected in series with the foregoing switches and contacts is a manually operable selector switch SS–1. Selector SS–1 must be closed to activate the control circuit to a condition operable to permit the flow of the fuel-air mixture to the infrared generators 28 and is incorporated in the circuit to provide operator control over the operating cycle. Thus the operator may initiate the flow of the fuel-air mixture to the infrared generators 28 concurrently with the arrival of articles to be heated at the oven 24 or at such other time as he may desire. Also, the selector switch is a further safety feature since, if the operator detects an abnormal condition, he can prevent operation of the infrared generators 28 by not closing the selector switch.

If both high temperature limit contacts HTL–1 and HTL–2 are closed, and if the conveyor is running so that conveyor interlock switch 106 is closed, manual closing of selector switch SS–1 will complete parallel circuits: (a) energizing the motor-operated gas valve MV which will then start to open, reaching the fully open position in approximately ten seconds; (b) energizing timer TR2 which opens its contacts TR2–1 upon completion of a timing cycle of 15 seconds duration; (c) energizing latch relay LR which latches latch relay contact LR–1 in the closed position, thereby energizing shutdown timer TR3 which opens its contact TR3–1 and closes its contact TR3–2 upon completion of a timing cycle of approximately 20 seconds duration; and (d) energizing the ignition transformers 107 which produce sparks at the sparkplug igniters 84 (see FIGURE 2) to ignite the gas issuing through the apertures 75 in the ceramic blocks 74 of the infrared generators. In conjunction with the circuits described in paragraphs (c) and (d) it should be noted that contacts CR–2 of relay CR are closed at this time.

Contacts CR–3 and CR–5 of the premixer control motors CM1 and CM2 are normally closed and, with them in this position, the proportioning valves described above are set to supply a rich starting mixture to infrared generators 28 to facilitate ignition of the mixture. The mixture ignites adjacent the igniters 84 and the flame travels across the infrared generators igniting the safety burners 86 at their opposite opposite ends. The flames of the safety burners heat flame rods FR1, FR2, FR3, and FR4 which, upon reaching a predetermined temperature, establish electrical circuit continuity in electronic flame safeguards CS–1, CS–2, CS–3, and CS–4. The electronic flame safeguards, the details of which form no part of the present invention, may be any one of several commercially available units such as, for example, the R–485 Protectorelay manufactured by Minneapolis-Honeywell. The four flame safeguards CS–1, CS–2, CS–3, and CS–4 are wired in series. Thus, if all four safety burners 86 light in the normal manner, continuity will be established in all four of the safeguards permitting a flow of current from main lead 102 through stop switch PB1, relay contacts M1–1 of relay M1, airflow switch AS1, and the flame safeguards to the coil of relay CR, thence to the return main lead 104. Completion of this circuit energizes the coil of relay CR which, upon energization: (a) closes relay contact CR–1 to complete a holding circuit around timer contact TR2–1 which it locks open; (b) opens relay contact CR–2 to deenergize latch relay coil LR and ignition transformers 107; (c) opens contacts CR–3 and CR–5 and closes relay contacts CR–4 and CR–6, causing the control motors CM1 and CM2 of premixers 54 and 56 to operate the proportioning valves from the rich starting mixture supplying position to the operating position supplying the normal operating fuel-air mixtures. Variations in heat output may be obtained by manipulating the manual selector switches SS–2 and SS–3 which, in the illustrated embodiment, may be moved to positions marked L, M, and H to provide low, medium, and high heat outputs.

Wired in parallel with the coil of relay CR are the "OVEN ON" signal lamp PL2 and the unlatch coil R of latch relay LR. Completion of the circuits in the electronic flame safeguards CS–1, CS–2, CS–3, and CS–4 in the manner described above simultaneously completes circuits: (a) through the "OVEN ON" signal lamp PL2, lighting this lamp to indicate that the infrared generators 28 are lit and supplying heat to the articles on conveyor 20; and (b) energizing the unlatch coil R of the latch relay, which unlatches relay contact LR–1, thereby deenergizing shutdown timer TR3. Since shutdown timer TR3 has been deenergized before completing its timing cycle, timer contact TR3–1 remains closed and timer contact TR3–2 remains open and the timer restores to its "zero time" condition. Thus, in the normal "start-up" cycle, shutdown timer TR3 does not function to disconnect the infrared generators from their fuel-air supply.

Thermocouples 110 and 112 (FIGURE 3) are located adjacent to, and measure the temperatures of the radiant surfaces 74 of the infrared generators. Preferably, one of the thermocouples is located adjacent the radiant surface 74 of a generator supplied from premixer 54 and the other adjacent the radiant surface of a generator supplied from premixer 56 to provide accurate temperature control. The temperatures measured by thermocouples 110 and 112 are visually indicated on dials incorporated in meter relays MR1 and MR2.

At this point, the system has reached its normal operating condition. The system may be shut down at any time by opening stop switch PB1 which will interrupt the circuits to the exhaust blower 80 and the premixers 54 and 56, turning them off, and to gas valve MV, allowing it to close. The circuit will then restore to the condition shown in FIGURE 5.

*Failure To Light*

If the infrared generators fail to light within 15 seconds after the gas valve MV opens, timer TR2 will have run through its operating cycle and will momentarily open its normally closed contact TR2–1. Under these conditions relay CR will not be energized since circuit continuity will not have been established in electronic flame safeguards CS–1, CS–2, CS–3, and CS–4 which are connected in series with the relay. In this conjunction, it will be remembered that establishment of circuit continuity in the flame safeguards requires that infrared generators 28 light and that they, in turn, light safety burners 86 to heat flame rods FR1, FR2, FR3, and FR4.

As relay CR is not energized, its contact CR–1 remains open and the holding circuit around timer contact TR2–1 of timer TR2 is not completed. Therefore, when timer contact TR2–1 opens, the circuits to purge timer TR1, gas valve MV, and timer TR2 are broken. After opening momentarily to interrupt the above circuits, contact TR2–1 will return to its normally closed position, and, since shutdown timer TR3 has not completed its cycle, so that shutdown timer contacts TR3–1 are still closed, timer TR1 is reenergized, starting a relighting cycle which is similar to the cycle described above. However, latch relay LR has previously been energized to latch contact LR–1 closed and since unlatch coil R has not been energized to unlatch the contact (for the same reason as relay CR with which it is connected in parallel), continuity is maintained in the circuit to shutdown timer TR3, which continues to run through its timing cycle. If ignition does not occur during the remainder of its timing cycle, shutdown timer TR3 will open its contact TR3–1, shutting down the system, and close its contact TR3–2, turning on the light PL3 which indicates to the operator that the infrared generators have failed to light.

The operator may initiate further ignition attempts by manually closing reset switch PB–3 to energize unlatch coil R. Energization of unlatch coil R releases latch relay contact LR–1, deenergizing shutdown timer TR3 which restores to its "zero time" condition, thereby closing shutdown timer contact TR3-1. Closing of shutdown timer contact TR3-1 reestablishes the circuit to the first timer TR1 and breaks the circuit through the combustion failure indicating light PL3. Completion of the two foregoing circuits in the manner described recycles the system through the operation sequence described above. The operator may repeat the attempt to establish ignition as many times as desired by repeatedly closing reset switch PB-3 following the completion of each lighting and relighting cycle.

If, during normal operation, combustion fails at one of the infrared generator banks 28a-d, the safety burner 86 located at the end of that bank will also go out since the safety burners are supplied with combustible mixture from the same source as the infrared generators. Failure of combustion at the safety burner 86 permits the asssociated flame rod FR1, FR2, FR3, or FR4 to cool, interrupting the circuit continuity of the associated electronic flame safeguard. Since the four electronic flame safeguards CS-1, CS-2, CS-3, and CS-4 are connected in series, interruption of circuit continuity in any one of these safeguards will interrupt the circuit to relay CR. Deenergization of relay CR opens its relay contact CR-1.

As relay contact CR-1 opens, it permits timer contact TR2-1 of timer TR2 to return to its normally closed position. For a predetermined delay interval, however, neither contact CR-1 nor contact TR2-1 is closed and the circuit to timer TR1 is interrupted, permitting it to restore to the "zero time" condition of FIGURE 5. Concurrently, motor valve MV moves to the closed position, shutting off the gas flow to the infrared generators, since it is connected in series with timer TR1.

Closing of timer contact TR2-1 again completes the circuit to purge timer TR1. The system then automatically repeats the purge and ignition cycles described above to automatically relight the infrared generators. If the generators do not relight on the first attempt, the system will attempt one further relight as described above under "FAILURE TO LIGHT" and, following failure to reestablish combustion on this attempt, will shut down the unit as described under that heading.

*Conveyor Shutdown*

As was discussed above, conveyor 20 is provided with an interlock switch 106 which is closed when the conveyor is running. If the conveyor stops while the oven is in normal operation, interlock switch 106 will open, interrupting the circuit to motorized valve MV and cutting off the gas flow to premixers 54 and 56. The infrared generators 28 and safety burners 86 will then go out, allowing flame rods FR1-FR4 to cool and open electronic flame safeguards CS1-CS4. Thereupon, relay CR will be deenergized, closing its contact CR-2 and opening its contact CR-1. This, as was described above, permits contact TR2-1 of timer TR2 to return to its normally closed position to again complete the circuit to purge timer TR1. The purge timer will then run through its cycle and, at the end thereof, will close its contact TR1-2, completing a circuit through relay M2 which, being energized, closes its contacts M2-1 and M2-2, starting up premixers 54 and 56 which, upon reaching operating speed, close airflow switches AS2 and AS3, all as was described above. However, the circuit beyond the airflow switches will be completed only through high temperature limit switches HTL-1 and HTL-2 and selector switch SS1 until conveyor 20 again starts, when switch 106 will again close and allow the remainder of the "start-up cycle" to take place in the manner described above.

*Overheated Burner*

If excessive radiant surface temperature causes either of the thermocouples 110 or 112 to exceed a predetermined maximum temperature, a circuit is completed from rectifier PS through meter relay MR1 or MR2, respectively, to limit control latch relay 114 which, upon energization, opens the high temperature limit contact HTL-1 or HTL-2 associated with the thermocouple sensing the overheated condition. Opening of the high temperature limit contact interrupts the circuit to gas valve MV which closes, cutting off the gas flow to premixers 54 and 56. The infrared generators go out and relay CR is deenergized.

When thermocouples 110 and 112 have cooled to a temperature below the predetermined maximum, the circuit to relay 114 can be manually opened by pressing pushbutton PB-4. Thereupon, contacts HTL-1 and HTL-2 will close, causing the control system to recycle and relight the infrared generators 28 in the manner described above.

While the individual components incorporated in this system are commercial products and function in their normal manner, their application to a conveyor type oven equipped with gas-fired infrared generators and the particular manner in which they are combined is novel and permits the attainment of results heretofore not achieved. Ovens of this type present problems not ordinarily encountered because of the difficulty in maintaining precise control of the temperature of the radiant surface so as to obtain efficient and economical heating together with durability of the oven parts and precise operator control of the heating effect. Moreover, safe and reliable ignition of the infrared generators is difficult to achieve since the surface combustion is almost flameless, a phenomenon which requires close control over varied mixtures of gas and air at different points in the operating cycle. Thus, the control system of the present invention provides an effective solution to a technically difficult and heretofore unsolved problem and, moreover, achieves this solution in an economical manner in that it requires no specially designed components.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Industrial heating apparatus, comprising:
   (a) combustion type infrared generator means;
   (b) fuel-air premixing means for supplying a fuel-air mixture to said generator means and including means for varying the fuel to air ratio of said mixture;
   (c) means for igniting said mixture; and
   (d) control means for sequentially:
      (1) activating said premixing means with said ratio varying means in a first operating condition to supply a fuel-rich starting mixture to said generator means;
      (2) activating said means for igniting said mixture; and
      (3) activating said ratio varying means to a second operating condition to supply a leaner fuel-air operating mixture to said generator means for maximum combustion efficiency.

2. In combination with infrared generator means;
   (a) means for supplying a combustible mixture to said generator means;
   (b) means for igniting said mixture; and a control system for said generator means, comprising:
   (c) manually activated, automatically operating means operatively associated with said combustible mixture supply means and said igniting means for:
      (1) activating said combustible mixture supplying means; and
      (2) simultaneously initiating the operating cycle of said means for igniting said mixture; and (d) means operatively associated with and activated by said igniting means at the completion of its operating cycle if combustion has not been established during said cycle to cause said igniting means to repeat said cycle including:
  (1) circuit means for applying operating voltage to said igniting means;
  (2) a timer effective at the end of its timing cycle to complete said circuit means; and
  (3) means associated with said timer and said igniting means and operative upon ignition failure to reenergize said timer means.

3. The combination as claimed in claim 2, wherein said control system includes in operative association with said combustible mixture supplying means and said igniting means, shutdown means automatically activated after a predetermined number of repetitions of said ignition cycle if combustion has not by then been established to:
  (a) deactivate said combustible mixture supplying means to prevent further supply of said mixture to said generator means; and
  (b) prevent further repetitions of the operating cycle of said igniting means.

4. The combination as claimed in claim 3, wherein said control system includes:
  (a) manually operable means for deactivating said shutdown means; and
  (b) means activated by operation of said manually operable means for causing said igniting means to repeat its operating cycle.

5. Industrial heating apparatus, comprising:
  (a) combustion type infrared generator means;
  (b) start-up means operable through a prescribed sequence of steps in response to sequentially occurring criteria to activate said generator means from an inoperative condition to an operating condition;
  (c) fuel-air premixing means for supplying a fuel-air mixture to said generator means and including means for varying the fuel to air ratio of said mixture;
  (d) means for igniting said mixture;
  (e) said start-up means comprising control means for sequentially:
    (1) activating said premixing means with said ratio varying means in a first operating condition to supply a fuel-rich starting mixture to said generator means;
    (2) activating said means for igniting said mixture; and
    (3) activating said ratio varying means to a second operating condition to supply a leaner fuel-air operating mixture to said generator means for maximum combustion efficiency.

6. Industrial heating apparatus, comprising:
  (a) combustion type infrared generator means; and
  (b) control means for said generator means, comprising:
    (1) start-up means operable from an initial condition through a prescribed sequence of steps in response to the sequential establishment of predetermined operation maintaining conditions to activate said generator means from an inoperative condition to an operative condition;
    (2) selectively and manually operable means operatively interposed in said start-up means for suspending the operation of said start-up means at a predetermined intermediate point in said sequence; and
    (3) means operatively associated with said start-up means including means responsive to the desistance of any one of said operation maintaining conditions to deactivate said generator means and means responsive to the desistance of any one of said operation maintaining conditions or the failure of said operation maintaining conditions to occur during the start-up sequence to actuate said start-up means for reinstating said start-up sequence.

7. Industrial heating apparatus, comprising:
  (a) means forming an enclosure;
  (b) combustion type infrared generator means in said enclosure;
  (c) means for purging said enclosure of explosive and combustible gases; and
  (d) control means for said generator means, comprising:
    (1) start-up means operable through a prescribed sequence of steps in response to the sequential establishment of predetermined operation maintaining conditions to activate said generator means from an inoperative condition to an operative condition including means for activating said purging means for a predetermined time interval; and
    (2) means operatively associated with said start-up means including means responsive to the desistance of any one of said conditions to deactivate said generator means and means responsive to the desistance of any one of said operation maintaining conditions or the failure of said operation maintaining conditions to occur during the start-up sequence to actuate said start-up means for reinstating the start-up sequence.

8. Industrial heating apparatus, comprising:
  (a) combustion type infrared generator means;
  (b) combustible mixture supply means for effecting flow of a combustible mixture to said generator means; and
  (c) control means for said generator means, comprising:
    (1) start-up means operable from an initial condition through a prescribed sequence of steps in response to sequential establishment of predetermined operation maintaining conditions to activate said generator means from an inoperative condition to an operative condition including means for activating said combustible mixture supply means at an intermediate step in said sequence to establish a predetermined rate of flow of combustible mixture to said generator means;
    (2) means operatively associated with said start-up means including means responsive to the desistance of any one of said conditions including the decrease of the rate of flow of the combustible mixture below said predetermined rate of flow to deactivate said generator means and means responsive to the desistance of any one of said conditions including the desistance of flow of the combustible mixture at said predetermined rate of flow or the failure of any one of said operation maintaining conditions to occur during the start-up sequence to actuate said start-up means for reinstating the start-up sequence.

9. Industrial heating apparatus, comprising:
  (a) combustion type infrared generator means;
  (b) conveyor means for moving material to be heated past said generator means; and
  (c) control means for said generator means, comprising:
    (1) start-up means operable from an initial condition through a prescribed sequence of steps in response to sequentially occurring criteria to activate said generator means from an inoperative condition to an operative condition, including a timer effective to control the duration of one of said steps and effective at the end of its cycle to initiate the next one of said steps; and (2) means operatively associated with said start-up means and responsive to the desistance of any one of a plurality of concurrently existing operation maintaining conditions to deactivate said generator means and reinitiate the start-up cycle including means activated by stoppage of said conveyor for reinitiating the timing cycle of said timer.

10. Industrial heating apparatus as defined in claim 9:
(a) including igniting means operable through an ignition cycle for igniting said combustible mixture; and
(b) wherein said start-up cycle reinitiating means includes means responsive to ignition failure for causing said igniting means to repeat said ignition cycle.

11. The heating apparatus of claim 10, wherein said start-up cycle reinitiating means comprises timing means activated after a predetermined number of successive ignition failures to prevent further supply of said combustible mixture to said infrared generator means.

12. The heating apparatus of claim 11, wherein said infrared generator control means includes manually operable reset means for deactivating said timing means and activating said igniting means to repeat said ignition cycle.

13. Industrial heating apparatus, comprising:
(a) combustion type infrared generator means; and
(b) control means for said generator means, comprising:
 (1) start-up means operable from an initial condition through a predetermined sequence of steps in response to sequentially occurring criteria to activate said generator means from an inoperative condition to an operative condition including a timer effective at the end of its timing cycle to initiate a succeeding one of said steps;
 (2) means operatively associated with said start-up means and responsive to the desistance of any one of a plurality of concurrently existing operation maintaining conditions to deactivate the generator means and reinitiate the start-up cycle including recycling means for reinitiating the timing cycle of said timer; and
 (3) means activated upon the attainment by the radiant surfaces of said generator means of a temperature above a predetermined maximum effective to condition said recycling means without reenergizing said timer to a stage in which, upon receipt of a further signal, said recycling means will be activated to reinitiate the timing cycle.

14. The heating apparatus of claim 13, including: manually operable means activatable upon cooling of said radiant surfaces below said maximum temperature to activate said recycling means.

15. Industrial heating apparatus, comprising:
(a) combustion type infrared generator means;
(b) means for supplying a fuel-air mixture to said generator means;
(c) means for igniting said fuel-air mixture;
(d) conveyor means for moving material to be heated past said generator means; and
(e) means for controlling the operation of said generator means, comprising:
 (1) start-up means operable from an initial condition through a prescribed sequence of steps in response to sequentially occurring criteria to activate said generator means from an inoperative condition to an operative condition;
 (2) shutdown means operatively associated with said start-up means including means responsive to the desistance of any one of a plurality of concurrently existing operation maintaining conditions to determine the supply of the fuel-air mixture to the generator means;
 (3) automatic cutoff means operably connected to said shutdown means for initiating said shutdown means upon:
  (a) failure of said fuel-air mixture to ignite within a predetermined time interval after activation of said igniting means,
  (b) failure of said fuel-air mixture to remain ignited;
  (c) stoppage of said conveyor means; or
  (d) attainment by the radiant surfaces of the generator means of a temperature above a predetermined maximum;
 (4) recycling means operable connected to said start-up means and operable upon activation to reinitiate the start-up sequence; and
 (5) means responsive to the operation of said shutdown means for conditioning said recycling means for activation.

References Cited by the Examiner

UNITED STATES PATENTS

| | | | |
|---|---|---|---|
| 2,136,256 | 11/38 | Sweet | 158—28 |
| 2,162,501 | 6/39 | Draper | 158—28 |
| 2,361,294 | 10/44 | Jones | 158—28 |
| 2,506,760 | 5/50 | Albright | 236—46 |
| 2,564,867 | 8/51 | Weber et al. | 263—10 |
| 2,690,304 | 9/54 | Weber | 236—15 |
| 2,748,845 | 6/56 | Marshall et al. | 158—28 |
| 2,767,784 | 10/56 | Dean | 158—99 |
| 2,859,024 | 11/58 | Weber et al. | 263—10 |
| 2,987,118 | 6/61 | Brown | 158—99 |
| 2,999,675 | 9/61 | Erkardt et al. | 263—3 |
| 3,049,169 | 8/62 | Bredesen et al. | 158—28 |

CHARLES SUKALO, *Primary Examiner.*

FREDERICK L. MATTESON, Jr., JOHN J. CAMBY, *Examiners.*